United States Patent Office 3,442,561
Patented May 6, 1969

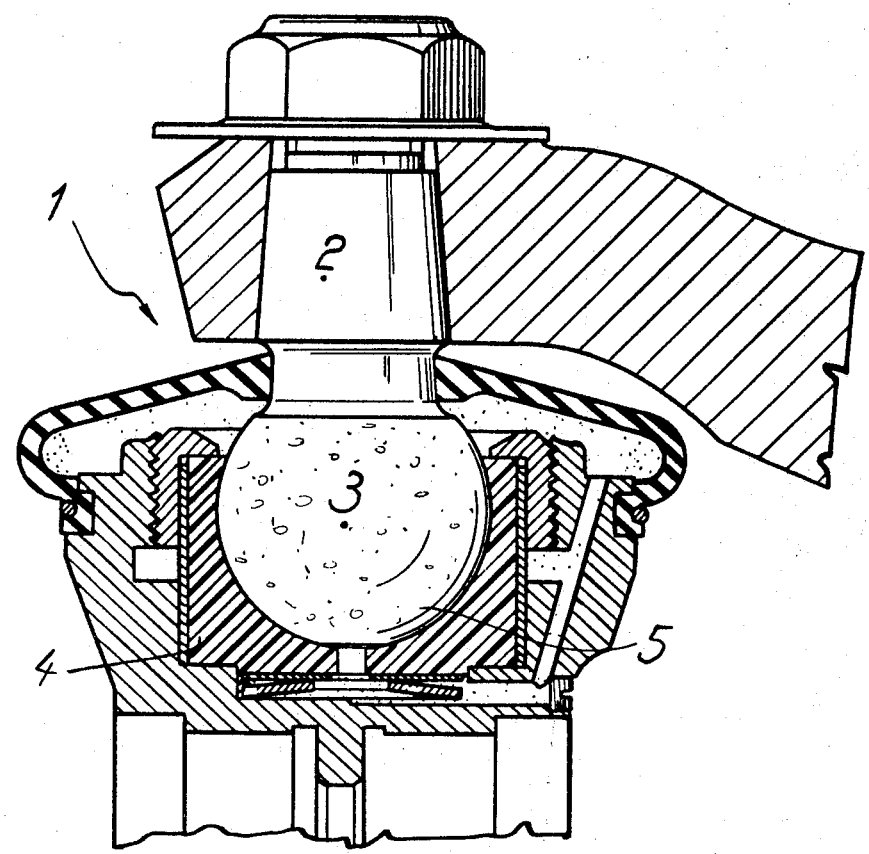

3,442,561
ROTARY JOINTS
Edmond J. G. Henry-Biabaud, Paris, France, assignor to Societe Anonyme Andre Citroen, Paris, France, a French society
Filed July 30, 1965, Ser. No. 476,156
Claims priority, application France, Aug. 6, 1964, 984,331
Int. Cl. F16c 9/06, 23/00, 33/00
U.S. Cl. 308—72                          1 Claim

ABSTRACT OF THE DISCLOSURE

A mechanical rotary joint having a spherical rotary element with a highly polished surface acting within a spherical seating. At least one part of the polished surface has a multitude of small cavities uniformly distributed thereon, the cavities having a width and depth of between one and thirty microns and having a lubricating agent retained therein.

---

It is known that the operational behaviour of rotary joints such as ball joints, knuckle joints and swivel joints, particularly those used for suspension members in a vehicle, which are subjected to heavy unital loadings, depends principally on the quality and effectiveness of the lubrication of the moving parts. In this respect, various solutions have been proposed for improving lubrication, for example the provision of so-called grease channels in the rotary member which constitute lubricant reservoirs. Nevertheless, since support surfaces are generally polished or have a very high finish, the heavy loads borne give rise to the elimination of the lubricant and vibrations, particularly when slight, are unable to return the lubricant to the moving parts. Moreover, the use of special lubricants, which may contain additives improving the coefficient of friction, has also not succeeded in overcoming the disadvantages of the known arrangements referred to above.

The present invention relates to a method of improving the lubrication and the operational behaviour of rotary joints, consisting essentially in subjecting the rotary member, after machining, to treatment by blasting with discrete particles such as sand or shot.

A slightly rough or at least matt surface state is thus obtained, in which the small cavities will constitute grease reservoirs uniformly distributed over the support surface of the ball. In addition, even when as the result of heavy loads the film of lubricant has been eliminated from the zone of support of the ball on its seat, the irregularities of the surface will effect sufficient entrainment of the grease situated in the zones adjoining the support zone during the movements of the ball or other rotary member.

It should however be noted that the nature and the grain or particle size of the material used for blasting will depend essentially on the dimensions of the rotary member, and above all on the unital loads to which it may be subjected. Moreover, the actual conditions of treatment (speed, flow, and possibly temperature of the blasting material) will be determined in accordance with the properties, and particularly the hardness of the metal of which the rotary member is composed.

It may be indicated that the depth of the surface irregularities is dependent on defects of shape of the rotary member and its seat, for a determined quality of grease, that is, since it is extremely difficult to obtain a perfectly spherical rotary member, and in the majority of cases the rotary member is slightly ogival in shape. The irregularities may for example be within a range of from a few microns to 2–3 hundredths of a millimetre. In this regard, it appears that shot-blasting would be preferable to sand-blasting when defects in shape are considerable, because it makes it possible to provide deeper irregularities, while in addition shot is a more regular and less fragile abrasive, the grain or particle size of which consequently remains substantially constant. As a result, very homogeneous and regularly distributed surface irregularities can be obtained.

In any case, the invention is not restricted to the use of any particular blasting material, but on the contrary covers the use of all abrasives capable of being used for treatment of the kind referred to.

The figure illustrates a section of one form of rotary joint made in accordance with the present invention.

The drawing shows a mechanical rotary joint 1 comprising at least one spherical element 2 having a highly polished and finished surface 3 which acts within a spherical seating 4. At least a portion of the polished surface 3 has a predetermined number of small cavities 5 uniformly distributed thereon. The cavities 5 have a width and depth of between 1 and 30 microns. A lubricating agent is retained within each of the cavities 5.

Finally, the invention extends to the new industrial products constituted by rotary joints in which the ball has a matt surface, at least in part, by application of the process defined above, or a variation thereof.

I claim:
1. A mechanical rotary joint comprising at least one spherical element having a highly polished and finished surface acting within a spherical seating, at least a portion of said polished surface having a predetermined number of small cavities uniformly distributed thereon, said cavities having a width and depth of between 1 and 30 microns and a lubricating agent retained within each of said cavities.

References Cited
UNITED STATES PATENTS 2,248,530  7/1941  Granger et al. _____ 51—320 X
2,885,236  5/1959  Carlson _____ 287—87 X MARTIN P. SCHWADRON, Primary Examiner.
FRANK SUSKO, Assistant Examiner.

U.S. Cl. X.R.
308—241